United States Patent [19]

Goetz

[11] Patent Number: 4,796,801
[45] Date of Patent: Jan. 10, 1989

[54] ARTICLE PACKAGE

[75] Inventor: Charles R. Goetz, Carnegie, Pa.

[73] Assignee: Alco Industries, Inc., Valley Forge, Pa.

[21] Appl. No.: 133,545

[22] Filed: Dec. 16, 1987

[51] Int. Cl.⁴ .............................................. B65D 5/00
[52] U.S. Cl. ................................ 229/104; 206/45.19; 229/122; 229/160
[58] Field of Search ............... 229/104, 122, 165, 167, 229/173, 16 R, 160, 6 R; 206/45.19, 557

[56] References Cited

U.S. PATENT DOCUMENTS

| 711,813 | 10/1902 | Austin et al. | 229/104 |
| 1,908,841 | 5/1933 | Hawks | 229/104 |
| 2,011,383 | 8/1935 | Taylor | 229/162 |
| 2,331,038 | 10/1943 | Meller | 206/429 |
| 2,465,169 | 3/1949 | O'Connor | 229/173 |
| 2,541,510 | 2/1951 | Fuerst | 206/45.19 |
| 3,493,122 | 2/1970 | McKee | 229/104 |
| 3,542,189 | 11/1970 | Goodman | 229/167 |
| 3,700,159 | 10/1972 | Beigel | 229/165 |
| 4,058,248 | 11/1977 | McArdle | 229/173 |

FOREIGN PATENT DOCUMENTS

| 63391 | 10/1982 | European Pat. Off. | 229/16 R |
| 1529841 | 6/1968 | France | 229/167 |

Primary Examiner—Stephen Marcus
Assistant Examiner—Gary E. Elkins
Attorney, Agent, or Firm—Webb, Burden, Ziesenheim & Webb

[57] ABSTRACT

A container having an open end so that a part of an article in the container can be seen and touched. The container is formed from a single planar sheet having two portions. The first portion of the planar sheet is rectangular in shape and includes a plurality of main panels and a terminal panel with laterally extending perforations along the inner edges. The second portion of the planar sheet is attached to a free edge of one of the main panels of the first portion of the planar sheet along a perforation and forms an end member to close one end of the container when it is assembled. A series of elongated openings are located along the perforation at the inner edge of the terminal panels of the first portion of the planar sheet and a series of corresponding tabs are located along the free edge of the main panel at the other end of the planar sheet. The container is assembled by folding the panels forming the end member together, folding the main panel and the terminal panel along the perforations and inserting the tabs into the elongated openings to hold the assembled container together.

7 Claims, 2 Drawing Sheets

ARTICLE PACKAGE

BACKGROUND OF THE INVENTION

1. Field of the Invention

This invention relates generally to packages and more particularly to a package in the form of a container for protecting an article during shipping, storage and display of the article while awaiting sale. A container according to the invention is designed to hold a pet carrier comprising a two-part nestable housing which is adapted to be assembled by the purchaser for transporting an animal. The pet carrier is shown and described in co-pending U.S. patent applications Ser. No. 090,835, filed Aug. 31, 1987 entitled "Pet Carrier" and U.S. Ser. No. 120,872, filed Nov. 16, 1987 entitled "Portable Pet Carrier" and owned by the asignee of the present application.

2. Brief Description of the Prior Art

Heretofore, containers for protecting manufactured articles during shipping, storage and display have had many shapes and sizes. In general, however, the containers have included a sufficient number of walls or panels to permit the containers to be closed entirely, so that an article located therein is not observable.

Contrary to prior containers, the container of the present invention is open at the top and one end to permit a potential purchaser to see and to feel the article in the container before making a purchase, in order to ascertain its quality. Moreover, the container serves as an advertising medium for the merchandise contained therein in that appropriate printed matter and/or labels may be placed on the exterior of the container panels.

SUMMARY OF THE INVENTION

The present invention is a container initially in the form of a single planar sheet, preferably of cardboard, appropriately sized, cut and perforated such that when the sheet is folded upon itself a unitary container or box for protecting an article is formed. When the sheet is folded, the resulting container is open at one end, thus permitting an article within the container to be seen and touched without opening the container and removing the article.

The article to be located within the container may be a two-part nestable pet carrier as described in the above-mentioned patent applications, but the container may be used for the shipping, storage and display of any article which is configured to be covered by the assembled container. A plurality of assembled containers, according to the invention, may be stacked for retail display.

The assembled container includes a number of exterior panels which are appropriate for displaying, advertising or other information. For example, labels may be affixed to certain of the panels to identify and/or illustrate the product contained in the container, to identify the manufacturer thereof, and/or to provide useful information such as assembly and/or display instructions.

DESCRIPTION OF THE PREFERRED EMBODIMENT

Figure 1:
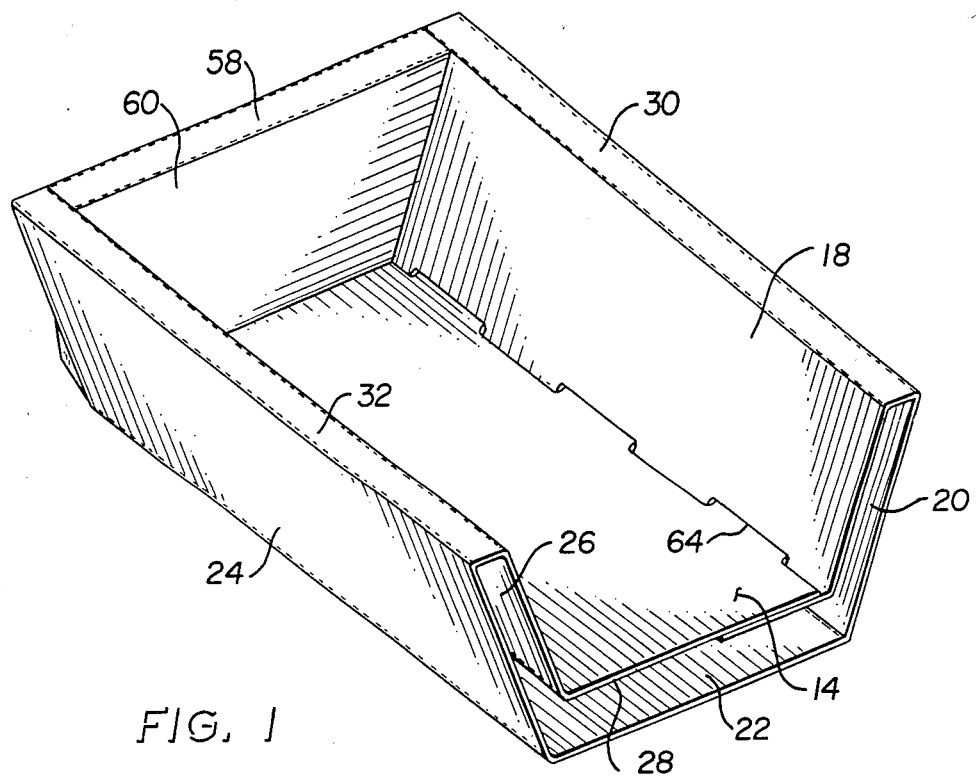
FIG. 1 is a perspective view of an assembled container according to the invention.

Referring to the drawings, a container according to the invention is formed from a single planar sheet 12, of cardboard or the like, which is appropriately sized, cut and perforated such that when it is folded and assembled, it forms a unitary container or carton for holding an article for shipping, storage and display.

The assembled container includes an open end 14. Thus, an article (not shown) located in the container may be seen through the open end 14 where it can be touched, by a potential purchaser to determine, among other things, the quality of the article.

The planar sheet 12 consists of two portions 16 and 17. The first portion 16 is substantially rectangular in shape and has a length which is approximately three times its width. The portion 16 comprises a plurality of panels 18, 20, 22, 24, 26 and 28; a pair of edge sections 30, 32 and a terminal panel 34. The panels and the edge sections are defined by spaced substantially parallel laterally extending perforations 36, 38, 40, 42, 44, 46, 48 and 50. In a preferred form the overall length of the first portion 16 of panel sheet is 46⅜" and the overall width is 15⅜".

The second portion 17 of planar sheet 12 which forms the end member of the container extends from an edge of panel 22 in the first portion 16 and is connected thereto along a perforation 52. The second portion consists of a panel 54 which has opposed inwardly tapered edge portions 55. Panel 54 is preferably about 10⅞" wide, and includes spaced substantially parallel perforations 53 and 56 which define an edge section 58 which is about ⅞" long. The terminal panel 60 of the second portion 17 is preferably about 4¾" long and tapers inwardly along edges 59 from a width of about 10" at the perforation 56 to a width of about 8¾" at its free edge.

There are a series of elongated openings or slots 62 extending along perforation 36 at the inner edge of the terminal panel 34 of the first portion 16 of the planar sheet 12. A series of tabs 64 corresponding in spacing and size to the slots 62 extend from the free edge 66 of the panel 28 at the opposite end of the first portion 16 of the planar sheet 12. When the container is being assembled, the tabs 64 are inserted into and through the slots 62 to hold the container in the assembled condition shown in FIGS. 1-3 of the drawings.

Figure 4:
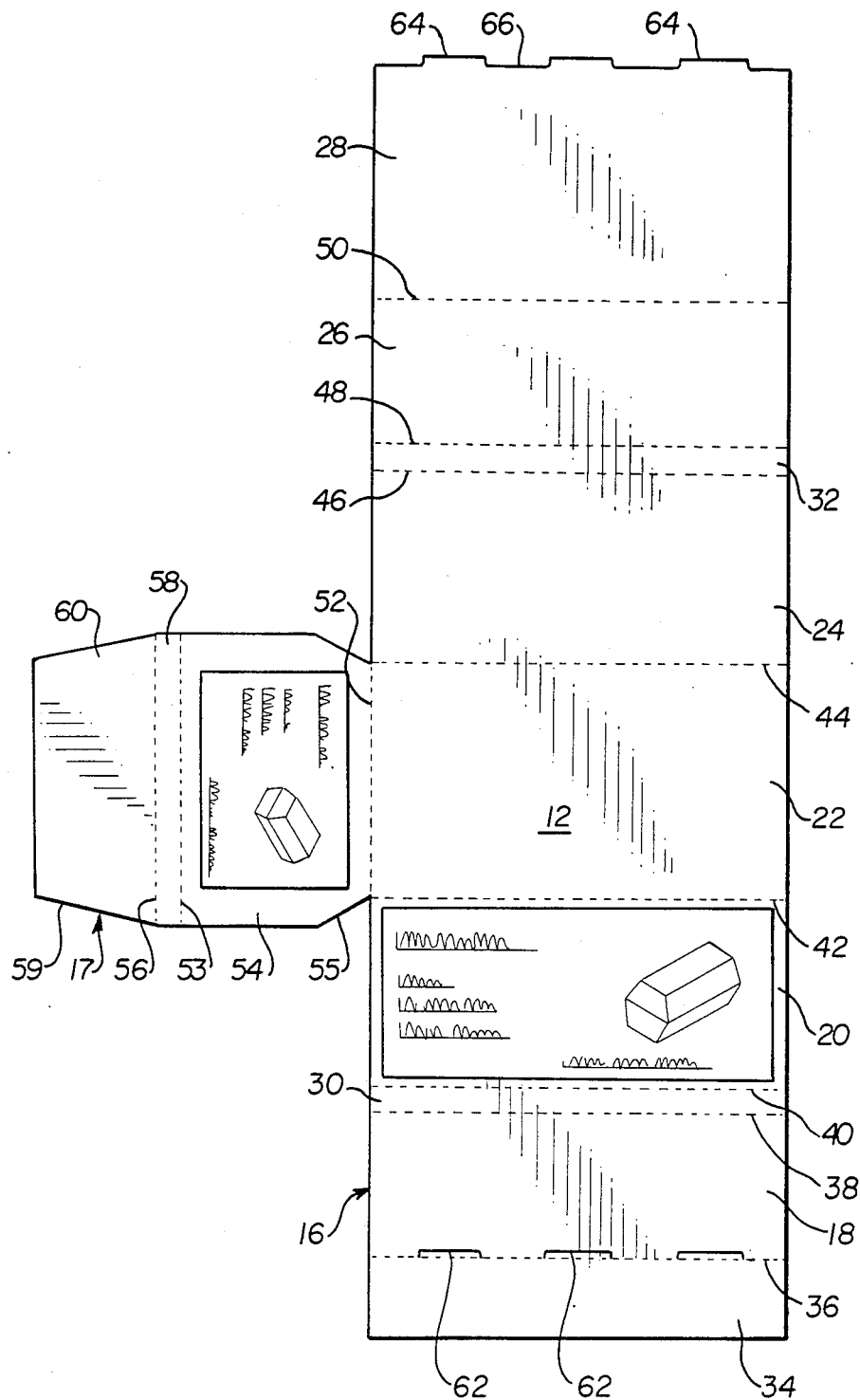
FIG. 4 is a top plan view of a planar sheet used to form the container shown in FIGS. 1-3.

As shown in FIG. 4 of the drawings, advertising labels or other printed indicia may be displayed on the exterior surface of the panels 20 and 54 or on any of the exterior surface of any other panel. The placement of the labels or printed indicia on the container encourages a retailer to orient the containers on display in the position desired by the manufacturer of the articles in the containers.

Assembly of a container is a quick and easy operation. First, planar sheet 12 is laid on a table or other surface with the side containing the labels or printed indicia facing the table top and the end member panels 54 and 60 are folded about perforations 52, 53 and 56 to form the closed end of the container. The first portion 16 of the planar sheet 12 is then folded along each of the perforations 36, 38, 40, 42, 44, 46, 48 and 50 into the configuration shown in FIGS. 1-3 of the drawings. The tabs 64 are now inserted into and through the slots 62 where they lock the container in its assembled configuration. The panel 60 on the second portion 17 of the planar sheet 12 is now folded downwardly between the opposed faces of side panels 18 and 26 so that the edged 59 of panel 60 contact the faces of the side panels.

Figure 2:
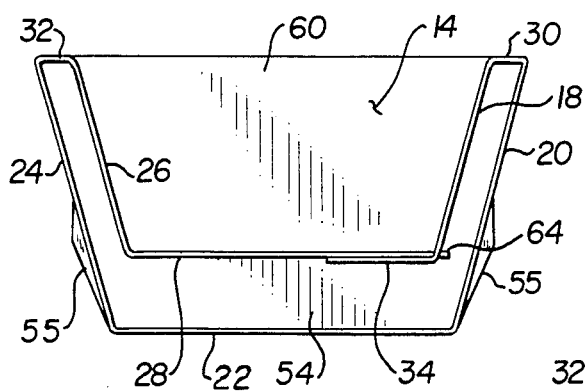
FIG. 2 is a top plan view of the assembled container shown in FIG. 1.
Figure 3:
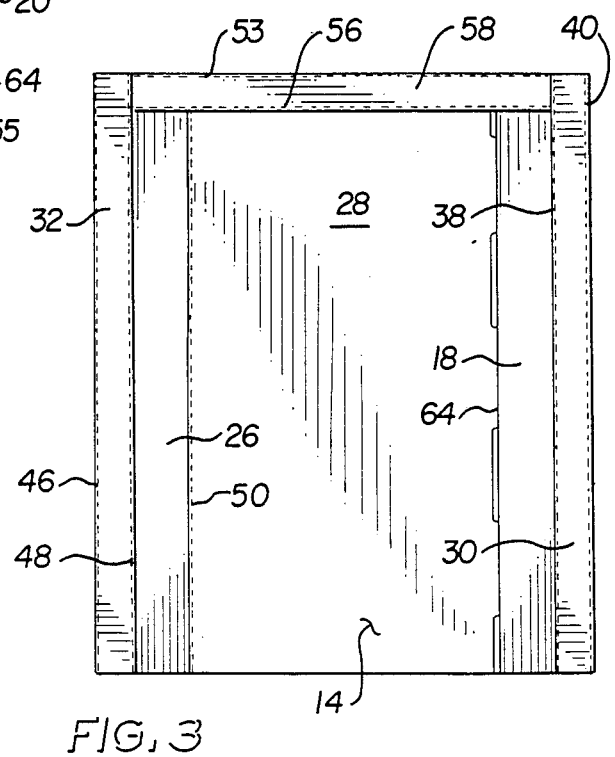
FIG. 3 is an end elevational view of the assembled container shown in FIG. 1 looking toward the open end.

Containers according to the invention may be stacked, either in the position shown in FIGS. 1-3 of the drawings, or in the case of a packaged pet carrier, in the inverted position from the position shown in FIG. 1 of the drawings. By properly orienting the printed matter on the exterior surfaces of the panels of the container, the correct position for shelf display of the packaged article is clearly dictated, whether a single container is displayed or a plurality of stacked containers are displayed.

While a particular embodiment of the container has been described in detail, namely, one for protecting a pet carrier or the type described in the U.S. patent applications referred to herein, it should be understood that the invention may be otherwise embodied within the scope of the appended claims.

I claim:

1. A blank adapted to be formed into a container for protecting an article during shipping, storage and display in which at least a part of the article can be seen and touched, said blank comprising:
   a planar sheet having a first portion substantially rectangular in shape with a length substantially greater than its width, said first portion having a pair of substantially parallel elongated opposed edges and a free edge at one end, said first portion including a plurality of main panels and a terminal panel opposite the end having said free edge, said terminal panel having an outer edge and an inner edge, each of said main panels being defined by lateral perforations extending between said opposed edges of said first portion,
   a single second portion attached to only one of said opposed edges of said first portion and adjacent to only one of said main panels of said first portion, said second portion attached to said one of said opposed edges of said first portion along a perforation, said second portion having a plurality of panels adapted to form an end member of a container when said blank is formed into a container to close one end of a container upon assembly of said blank into a container, and
   a series of elongated openings located along said inner edge of said terminal panel of said first portion and a series of tabs extending along said free edge of said first portion, the spacing of said tabs corresponding to the spacing of said elongated openings,
   whereby said blank is formed into a container by folding said main panels and said terminal panel along said perforations and inserting said tabs into said elongated openings to hold the container together and folding said panels of said second portion to form the end member to close one end of the container formed from said blank.

2. A blank as set forth in claim 1 including printed matter on the exterior surface of at least one of said panels.

3. A blank as set forth in claim 2 wherein said printed matter is displayed on a label affixed to the exterior surface of at least one of said panels.

4. A blank as set forth in claim 1 wherein said second portion of said planar sheet has two panels, an edge section located between said two panels and an elongated perforation connecting said edge section to each of said panels.

5. A blank as set forth in claim 4 wherein each of said two panels has opposed free side edges and at least a portion of each of said free side edges is formed at an angle.

6. A blank as set forth in claim 1 wherein the width of said elongated openings is slightly greater than the width of said tabs.

7. A blank as set forth in claim 1 wherein said first portion of said planar sheet has five main panels and includes a plurality of edge sections, each of said edge sections being located between a pair of main panels and connected to each of said main panels by a laterally extending perforation.

* * * * *